United States Patent
Bachofer

(10) Patent No.: US 9,410,628 B2
(45) Date of Patent: Aug. 9, 2016

(54) VALVE DEVICE

(71) Applicant: MACK & SCHNEIDER GmbH, Fiderstadt (DE)

(72) Inventor: Steffen Bachofer, Filderstadt (DE)

(73) Assignee: Mack & Schneider GmbH, Filderstadt (DE)

( * ) Notice: Subject to any disclaimer, the term of this patent is extended or adjusted under 35 U.S.C. 154(b) by 0 days.

(21) Appl. No.: 14/706,127

(22) Filed: May 7, 2015

(65) Prior Publication Data
US 2015/0233476 A1    Aug. 20, 2015

Related U.S. Application Data

(63) Continuation of application No. PCT/EP2013/073221, filed on Nov. 7, 2013.

(30) Foreign Application Priority Data

Nov. 7, 2012    (DE) .......................... 10 2012 022 213

(51) Int. Cl.
*F16K 1/32* (2006.01)
*F16K 1/22* (2006.01)
*F16J 15/447* (2006.01)

(52) U.S. Cl.
CPC .................. *F16K 1/32* (2013.01); *F16J 15/447* (2013.01); *F16K 1/221* (2013.01)

(58) Field of Classification Search
CPC ............. F16K 1/22–1/221; F16K 35/06; F16J 15/447; F16C 33/80
USPC ........... 251/291–292, 305–308; 277/303, 412
See application file for complete search history.

(56) References Cited

U.S. PATENT DOCUMENTS

| 1,842,788 A | * | 1/1932 | Kramer | F16K 17/32 137/448 |
| 3,173,650 A | * | 3/1965 | Cotterman | F16K 1/2265 251/288 |
| 4,022,424 A | * | 5/1977 | Davis | F16K 1/224 251/214 |

(Continued)

FOREIGN PATENT DOCUMENTS

| DE | 2438875 | 2/1976 |
| DE | 3416970 | 11/1985 |

(Continued)

OTHER PUBLICATIONS

International Search Report of corresponding International Application No. PCT/EP2013/073221, mailed on Feb. 20, 2014.

(Continued)

*Primary Examiner* — John Bastianelli
(74) *Attorney, Agent, or Firm* — Edell, Shapiro & Finnan LLC

(57) ABSTRACT

A valve arrangement having a valve, in particular, a disk valve, is provided which has a first housing with several connections for a fluid or a gaseous medium, and with a drive unit, which has a second housing with a drive mechanism arranged therein. The housings are at least essentially spaced apart from one another. The valve has a control shaft and the drive unit and a drive shaft that is operatively connected to the drive mechanism and operatively connected or operatively connectable to the control shaft by means of a coupling device. The coupling device is arranged between the first and the second housing.

8 Claims, 6 Drawing Sheets

(56) References Cited

U.S. PATENT DOCUMENTS

| | | | |
|---|---|---|---|
| 4,046,350 A | 9/1977 | Massey et al. | |
| 5,676,472 A * | 10/1997 | Solomon | B25J 19/0075 277/347 |
| 7,556,239 B2 * | 7/2009 | Beebe | F16K 5/0642 251/248 |
| 7,770,557 B2 * | 8/2010 | Ikeda | B29C 45/1671 123/337 |
| 2005/0183705 A1 * | 8/2005 | Nanba | F02D 9/1045 123/568.24 |

FOREIGN PATENT DOCUMENTS

| | | |
|---|---|---|
| DE | 9212236 | 5/1993 |
| DE | 68906980 | 12/1993 |
| DE | 10323661 | 12/2004 |
| DE | 102009024361 | 12/2010 |
| EP | 1967777 | 9/2009 |
| FR | 2317581 | 2/1977 |
| FR | 2463349 | 2/1981 |
| WO | 02059515 | 8/2002 |
| WO | 2010142965 | 12/2010 |

OTHER PUBLICATIONS

English language International Preliminary Report on Patentability for International Application No. PCT/EP2013/073221.

* cited by examiner

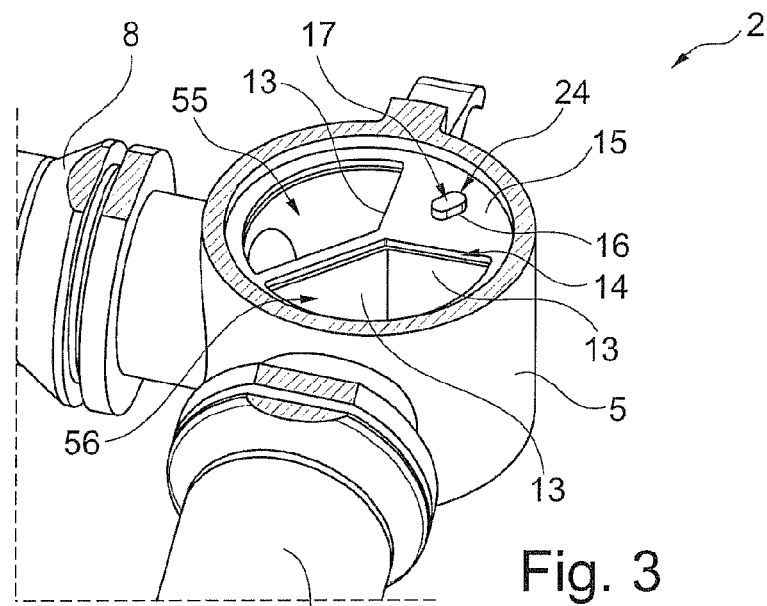
Fig. 3
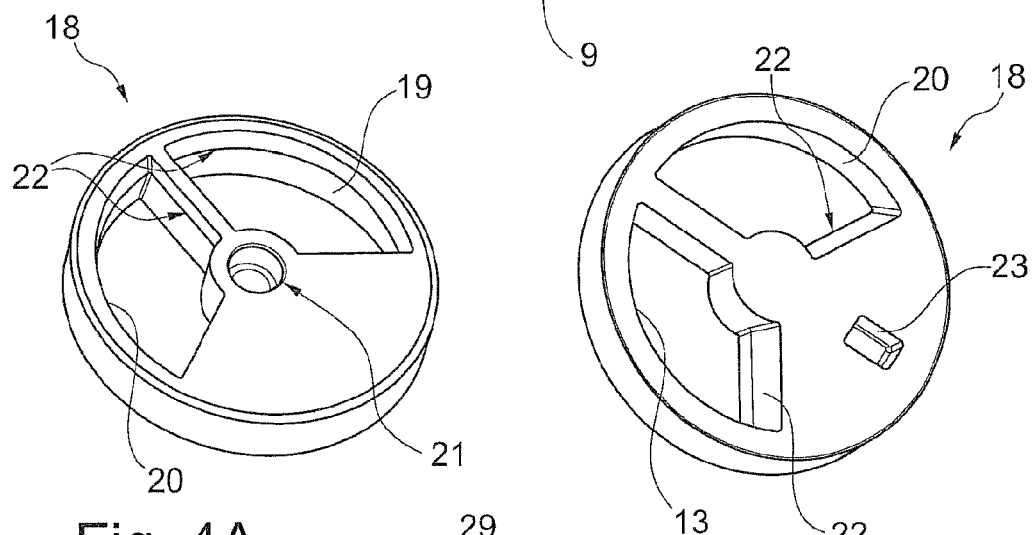
Fig. 4A
Fig. 4B
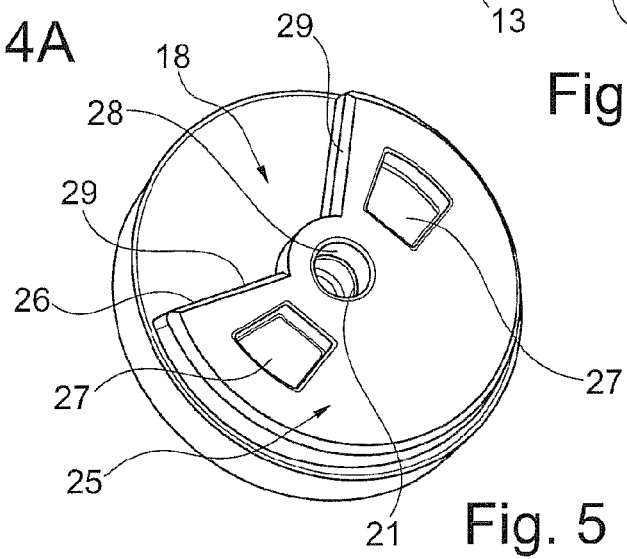
Fig. 5

VALVE DEVICE

CROSS REFERENCE TO RELATED APPLICATIONS

This application is a continuation of International Application No. PCT/EP2013/073221, filed on Nov. 7, 2013, which claims priority under 35 U.S.C. §119 to Application No. DE 102012022213.0 filed on Nov. 7, 2012, the entire contents of which are hereby incorporated by reference.

FIELD OF THE INVENTION

The invention relates to a valve arrangement having a valve, in particular a disk valve, which has a first housing with several connections for a fluid and/or gaseous medium, and a drive unit, which has a second housing with a drive mechanism arranged therein. The housings are at least essentially arranged at a distance from one another.

BACKGROUND

Valve arrangements of the type described above are known from prior art and are used, for example, in motor vehicles for regulating cooling water circuits or in drink vending machines. A disk valve arrangement, for example, is known from U.S. Pat. No. 5,950,576 A, which comprises a disk valve and a drive unit. The disk valve has a first housing, in which the elements required for setting the flow cross-sections, such as, by way of example, a pivotable valve disk, are arranged. The drive unit has an electromechanical drive mechanism which is arranged in a second housing. In this case, the first housing is spaced apart from the second housing, wherein a drive shaft of the drive mechanism protrudes from the second housing into the first housing, where it is positively connected to the valve disk for guided rotation. The installation of the disk valve arrangement is therefore relatively difficult and, in particular, not suitable for using a simple modular system during the installation.

SUMMARY

The underlying object of the invention therefore is to provide a valve arrangement which can easily and cost-effectively simplify the installation of the valve arrangement and also allow for the use of a modular system.

The valve arrangement according to an example embodiment, in particular the disk valve arrangement, has the advantage that the valve, in particular the disk valve and the drive unit are connected to one another in the region between the housings for torque transfer. As a result of this, the coupling point of the drive unit to the valve/disk valve is located in an accessible area and allows the disk valve and the drive unit to be completely preassembled before they are put together in order to form the valve arrangement or disk valve arrangement. Installation is therefore simplified, and it is possible to combine different valves/disk valves with different drive units in a simple manner, as a result of which a modular system can be used during the installation. The example embodiment is characterized in that the disk valve has a control shaft and the drive unit a drive shaft that is operatively connected to the drive mechanism and operatively connected/operatively connectable to the control shaft by means of a coupling device, and that the coupling device is arranged between the first and the second housing. Thus a shaft protrudes from the first as well as from the second housing into the space between both housings so as to be operatively connected to one another there by the coupling device. The torque is thus transferred from the drive unit to the disk valve in the gap between the first and the second housing, resulting in the advantages described above.

According to an example embodiment, the coupling device is configured as a positive coupling. The positive coupling allows a direct torque transfer from the control shaft to the drive shaft. The positive coupling is conveniently configured in the direction of the guided rotation at least essentially without clearance, so that exact setting or actuation of the disk valve is ensured. The positive coupling is preferentially configured with clearance when viewed axially in order to compensate for temperature-induced or tolerance-induced length differences of both shafts and/or of the housings. Alternatively, it is also conceivable to configure the coupling device as a force locking coupling.

A coupling device configured as a gear or claw coupling is especially preferred. In this case the coupling device can be configured by guided rotation elements that can be attached to the drive shaft and the control shaft or can be integrally configured by the drive shaft and the control shaft in one piece. According to an embodiment, in the case of the gear or claw coupling, the gearing or claws can be arranged on the front side of the respective shaft.

According to an example embodiment, it is provided that the coupling device is formed by an external gearing of the control shaft and an internal gearing of the drive shaft engaging with the external gearing. In this way, the control shaft protrudes with its free end regionally into the hollow shaft section of the drive shaft in order to transfer the torque by means of the external gearing and the internal gearing. Here, the coupling device is formed by the drive shaft and control shaft itself. An inverse configuration is obviously also possible, in which the external gearing is provided on the drive shaft and the internal gearing on the control shaft. In general, it can be said that the drive shaft and the control shaft are preferably positively connected to one another by mutually complementary polygonal shapes for transferring the torque.

According to an example embodiment, it is provided that a splash guard is allocated to the coupling device. The splash guard prevents moisture, for example splashing water, from getting into the coupling device and from there into the drive unit or into the disk valve. The service life of the valve arrangement is generally increased by the splash guard.

It is preferably provided that the splash guard has at least one first protective panel at least essentially circumferentially surrounding the coupling device. This protective panel can be completely continuous or can be configured with one or more recesses or interruptions which are in particular used for ventilating or cooling the coupling device. The protective panel preferentially extends between both housings such that it extends from one housing at least essentially to the other housing. The recesses in the protective panel are preferably also used for draining a potential leak of a component of the disk valve. In case of a fault or defect, or when a short-term leak occurs owing to extreme system conditions, fluid may flow out through the recesses, so that the drive unit is protected against fluid escaping from the valve.

It is especially preferably provided that the first protective panel is configured in one piece with the first or the second housing. The protective panel must therefore not be installed afterward, but it is already provided by one of the housings. On installation, the coupling device thus automatically enters the area of the splash guard.

According to an example embodiment, it is provided that the splash guard at least has a second protective panel circumferentially surrounding at least essentially the coupling device, which second protective panel has a larger or smaller diameter than the first protective panel in order to form a labyrinth seal for the coupling device together with the first protective panel. The second protective panel, in this case, is also preferentially configured with one or more recesses or interruptions for ventilating or cooling the coupling device. The recesses of the first protective panel and of the second protective panel are in particular preferably offset to one another in order to ensure full splash protection. On installation, the first and second protective panels are inserted into one another owing to the different diameters, for which purpose they are conveniently arranged coaxially to one another when the housing is installed. In this case both protective panels can be securely arranged on different housings or on one of the housings or configured in one piece.

Owing to the different diameters, a space between the protective panels is advantageously created, which in particular can be used for drainage. Independently of how the valve is installed relative to the drive unit, that is, essentially independently of the position of the angle of rotation of the valve relative to the drive unit, outward drainage is thus ensured at any time.

According to a preferred embodiment, it is provided that the first protective panel is configured in one piece with the first housing and the second protective panel in one piece with the second housing. As a result of this, the guiding together of both housings creates the labyrinth seal by means of both protective panels. On their respective free front sides, the protective panels are preferably arranged or configured with a space between them and the respective opposite housing at least in sections in order to ensure additional ventilation/cooling and, in particular, to avoid overdetermined bearing of the housings against one another.

According to an according to an example embodiment, it is provided that the first and/or the second housing has at least one spacer which is in particular configured as a screw dome. The spacers ensure the distance between both housings and the positioning of the ends of the drive shaft and of the control shaft relative to one another. At least one of the spacers can also be formed by the splash guard or by one of the protective panels. Due to the preferred configuration of each of the spacers as screw domes, the spacers at the same time provide the securing means for securing both housings to one another. The respective screw dome is characterized by an internal thread which is formed in one piece by the screw dome or by a threaded element inserted into each screw dome, and into which a screw can be screwed for securing one housing to the other housing.

BRIEF DESCRIPTION OF THE DRAWINGS

Example embodiments will now be described with reference to the drawings.

FIG. 3 is a cross-sectional view of the disk valve according to an example embodiment.

FIGS. 4A and 4B are different perspective views of a gasket of the disk valve according to an example embodiment.

FIG. 5 is a perspective view of a valve disk interacting with the gasket according to an example embodiment.

DETAILED DESCRIPTION

Figure 1:
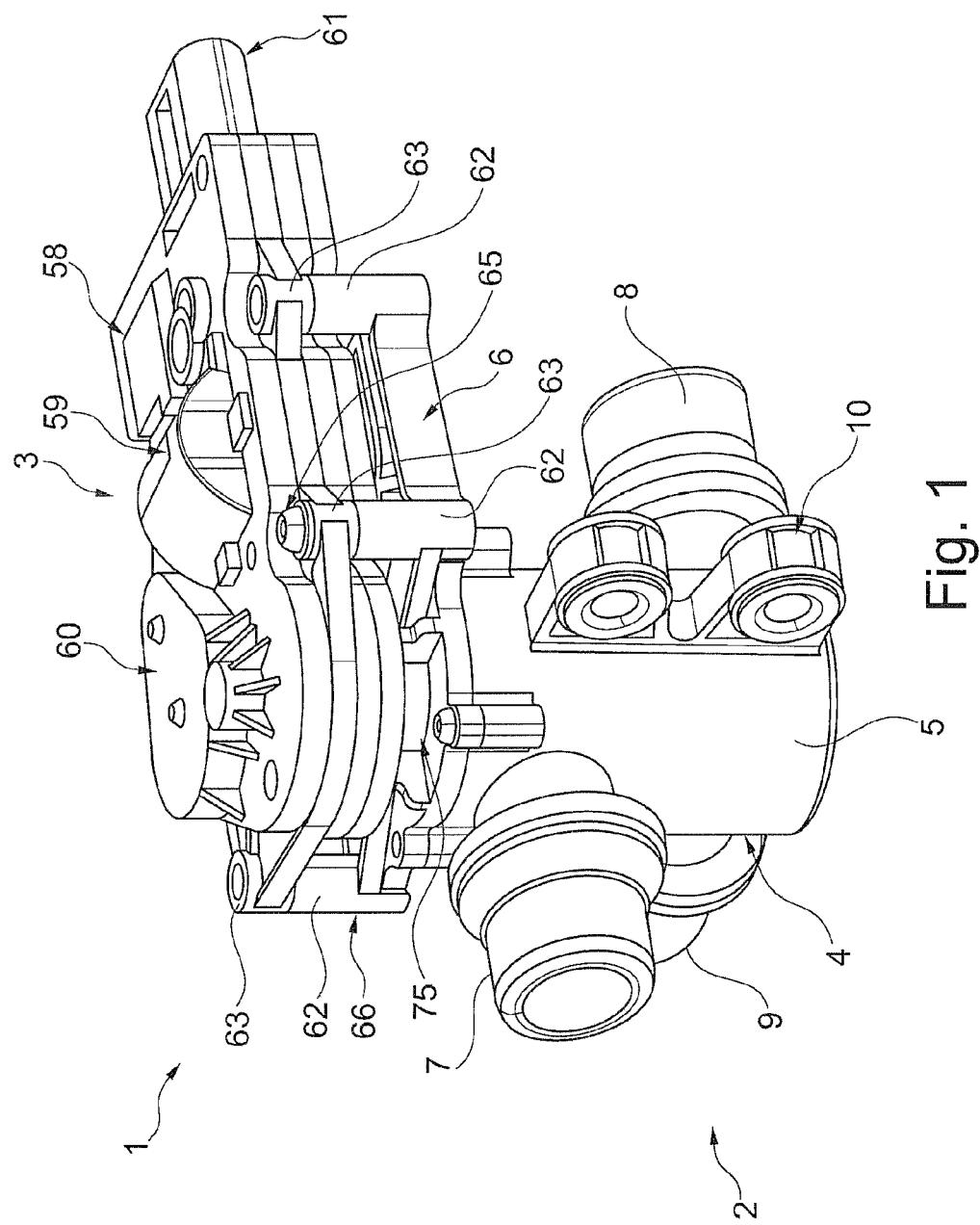
FIG. 1 is a perspective view of a disk valve arrangement according to an example embodiment.

FIG. 1 is a perspective view of a valve arrangement 1 configured as a disk valve arrangement, which has a disk valve 2 as well as a drive unit 3.

The disk valve 2 has a housing 4, which is formed by a distributor housing 5 and a cover 6. The distributor housing 5 has three connections, of which one is configured as an inlet connection 7, and the other two as outlet connections 8 and 9. In addition, the distributor housing 5 has a holding device 10 for securing the valve arrangement 1, for example to the body of a motor vehicle.

The drive unit 3 is mounted on the cover 6, which drive unit 3 is in particular configured as an electromotive actuating drive having an electric motor 59, which is not shown in detail, as well as a gear 60 operatively connected to the electric motor 59 with a drive shaft 70, which can be coupled to a control shaft of the disk valve 2 in order to distribute a medium provided on the inlet connection 7 to the outlet connections 8, 9 as desired. This will be addressed in more detail below.

Figure 2:
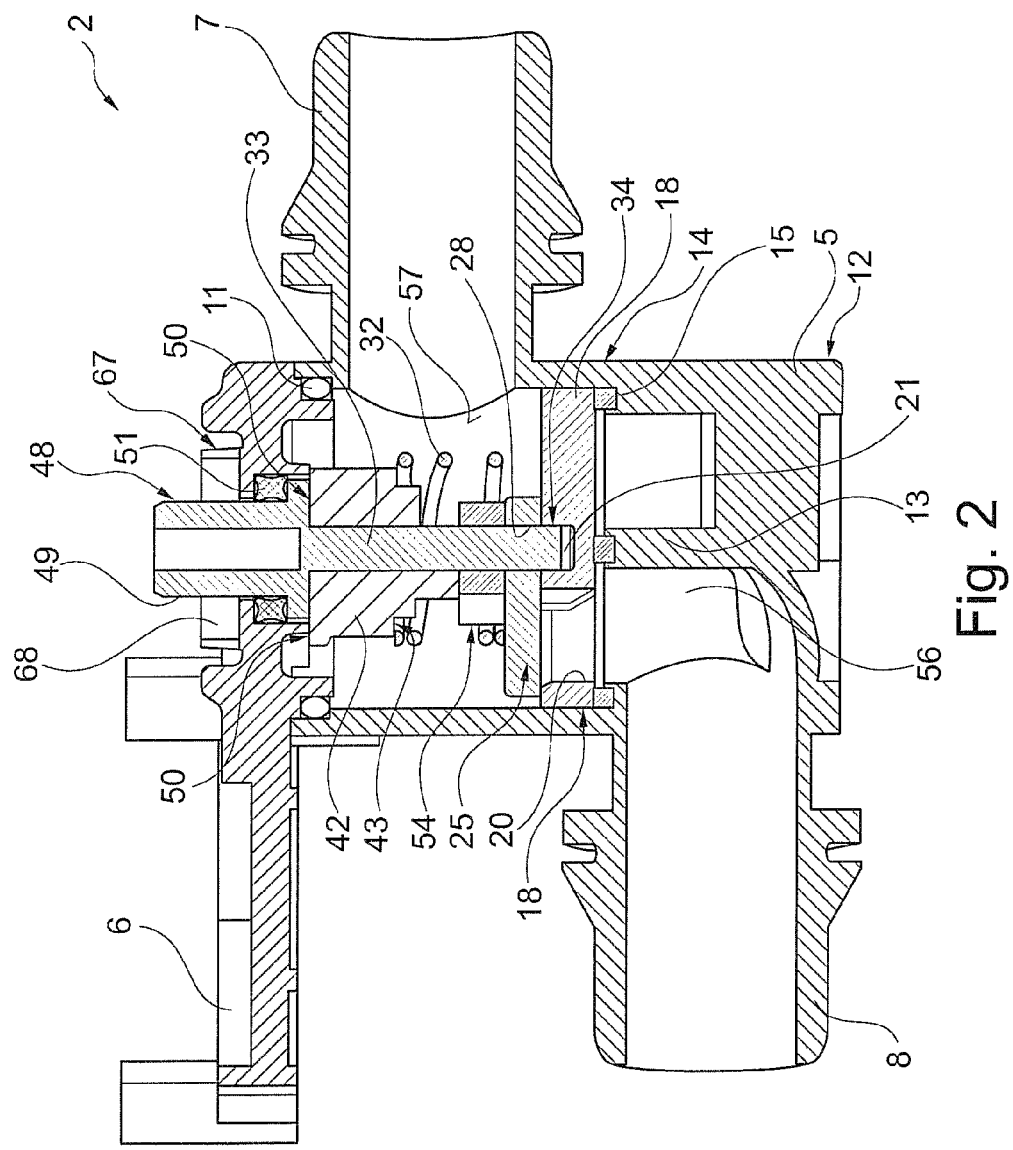
FIG. 2 is a longitudinal sectional view of a disk valve of the disk valve arrangement according to an example embodiment.

In this regard, FIG. 2 is a longitudinal view of the disk valve 2. The distributor housing 5 is essentially configured in a cup shape so that, when viewed in the longitudinal section, its basic shape is U-shaped. The connections 7, 8, 9 are configured on a single level with the distributor housing 5 in the present specification. The cover 6 closes the open end of the distributor housing 5, wherein a sealing element 11 is also provided between the cover 6 and the distributor housing 5, and which is configured as an O-ring in the present specification. The inlet connection 7—when viewed axially—leads to the distributor housing 5 above the outlet connection 8, that is, close to the cover 6. A partition panel 13 starts at the bottom 12 opposite the cover 6, which partition panel 13 extends parallel along the length of the distributor housing 5 or ends axially and above the connection 8 forming an intermediate bottom 14 at its free front side.

According to an example embodiment, in a cross-sectional view of the disk valve 2, FIG. 3 shows a top view of the intermediate bottom 14 or of the distributor housing 5 above the outlet connections 8 and 9. The partition panel 13 forms two chambers 55, 56 into each of which one of the outlet connections 8, 9 leads. The chambers 55 and 56, in this case, make up approximately one third of the distributor housing 5, while a remaining third is formed by the intermediate bottom 14. The intermediate bottom 14 in part extends as a ridge along the inner side of the housing wall over the entire circumference of the distributor housing 5 to form a continuous contact surface. It is completed by the free front side of the partition panel 13. The chambers 55 and 56 thus extend essentially over approximately 120° of the circular distributor housing 5, while a major part of the intermediate bottom 14 of the remaining 120° is formed by the partition panel 13.

A profile gasket 15, whose contour essentially matches the contour of the intermediate bottom 14 and which is designed to be elastically deformable, is supported on the intermediate bottom 14. The profile gasket 15 has an additional perforation 16, through which an axial protrusion 17 of the intermediate bottom 14 runs to form an anti-twist lock 24 for the profile gasket 15. In this case, the height of the axial protrusion 17 is selected such that it projects over the profile gasket 15.

FIGS. 4A and 4B are two perspective views of a ceramic gasket 18. According to FIG. 2, the gasket 18 is supported on the profile gasket 15, wherein the contour of the gasket 18 at least essentially matches the contour of the profile gasket 15 or the intermediate bottom 14.

FIG. 4A is a top view of the gasket 18 from the direction of the cover 6 according to FIG. 2. The gasket 18 has two through-flow openings 19, 20, which likewise constitute a circular segment that extends over approximately 120° corresponding to the chambers 55 and 56. On the front side facing the cover 16, the gasket 18 also has a bearing seat 21, which is configured as a cylindrical recess in the center of the gasket 18. The flow-through openings 19, 20 are each also provided with a chamfer 22 on the same front side to improve the flow conditions.

Advantageously, such chamfers 22 are also provided on the back of the gasket 18 in the region of the flow-through openings 19, 20, as is shown in FIG. 4B. The gasket 18 also has a receiving recess 23 on its front side facing away from the cover 16, whose contour essentially matches the contour of the axial protrusion 17 and which serves to receive at least regionally the axial protrusion 17 to form an anti-twist lock for the gasket 18 on the intermediate bottom 14. By means of this and the positive anti-twist lock 24, a secure arrangement of the gasket 18 and of the profile gasket 15 on the distributor housing 5 is ensured in a simple and cost-effective manner.

FIG. 5 shows another top view of the gasket 18, namely of the front side facing the cover 6. Here a valve disk 25 is also arranged on the gasket 18 which likewise is made of ceramic and whose outer diameter essentially matches the outer diameter of the gasket 18. In the present exemplary embodiment, the outer diameter of the valve disk 25 is slightly smaller in order to avoid frictional contact with the inner surface of the distributor housing 5, as is also shown in FIG. 2. The valve disk 25 has the shape of a circular segment and extends over a circular segment of approximately 240°. The remaining 120° of the valve disk 25 are free and have an open border in order to form a flow-through opening 26 which sets a flow cross-section in an overlapping position with at least one of the flow-through openings 19, 20 of the gasket 18. Depending on the turning position of the valve disk 25, a desired flow cross-section between the inlet connection 7 and at least one of the outlet connections 8, 9 can be set. The valve disk 25 thus makes full contact with the gasket 18 and on its front side facing away from the valve disk 25, has two trough-shaped recesses 27, which are arranged on both sides of the center of the valve disk 25 and are configured in mirror symmetry, but not point-symmetrically, so that incorrect installation of the disk valve 2 is prevented, as will be explained in detail below. Furthermore, the valve disk 25 has a circular perforation 28 in the center, which forms an extension of the bearing seat 21 and, in this respect, likewise has a circular contour. The valve disk 25 is also provided with chamfers 29 on the flow-through opening 26 for improved flow behavior.

Figure 6:
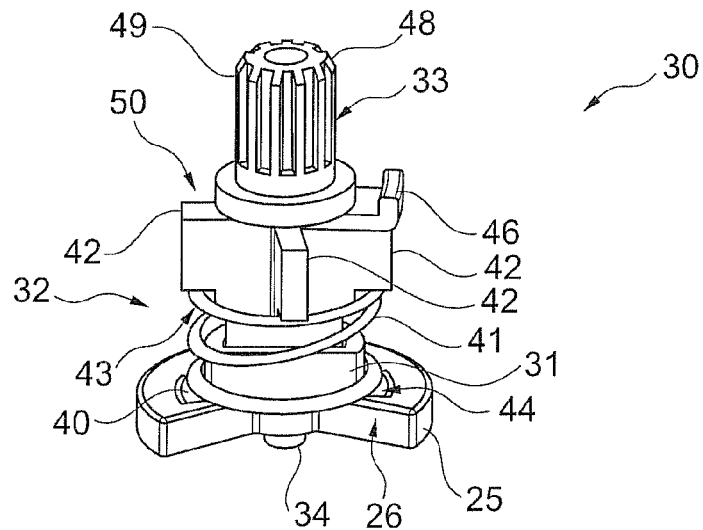
FIG. 6 is a perspective view of a preassembled unit of the disk valve according to an example embodiment.

FIG. 6 is a perspective view of a preassembled unit 30, which consists of the valve disk 25, an intermediate element 31, a spring element 32, and a control shaft 33.

The control shaft 33 protrudes with a free end 34 through the perforation 28 of the valve disk 25 in order to engage with the bearing seat 21, as is shown in FIG. 2. For this purpose, the free end 34 of the control shaft 33 is likewise cylindrical, wherein the outer diameter of the free end 34 and the inner diameter of the bearing seat 21 are selected such that together they form a radial slide bearing for the control shaft 33.

Figure 7A:
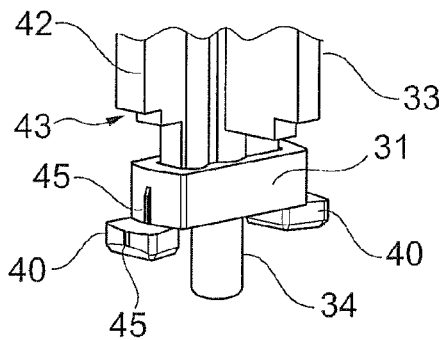
FIGS. 7A and 7B are different views of an anti-twist lock of the disk valve according to an example embodiment.
Figure 7B:
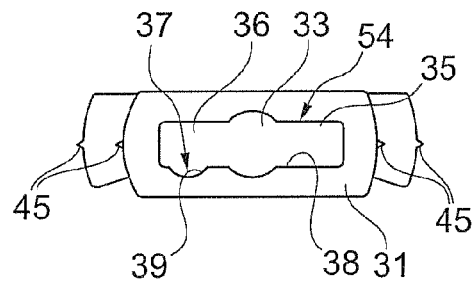

The control shaft 33 has an asymmetrical cross-sectional contour spaced apart from the free end 34, as is shown in FIGS. 7A and 7B. In this connection, FIG. 7B shows a cross-section of the control shaft 33 in the region of the intermediate element 31. Here the control shaft 33 has two protrusions 35, 36 that are opposite one another and protrude from the control shaft 33, wherein the protrusion 36 on a lateral wall has an additional protrusion 37, which has a curved contour in the present exemplary embodiment. The intermediate element 31 has an opening 38 in the region of the protrusions 36, 35 that matches the contour of the controls shaft 33. The opening 38 has an additional lateral recess 39 into which the additional protrusion 37 can be inserted. The control shaft 33 and the intermediate element 31 can thus be connected to one another in only one way. As a result of this, incorrect installation is reliably prevented.

FIG. 7A is a perspective view of the control shaft 33 with the intermediate element 31. The intermediate element 31 has two support feet 40 on the side facing the valve disk 25, which support feet 40 preferentially are configured in one piece with the intermediate element 31 and can be inserted into or engage in the recesses 27 of the valve disk 25. Due to the asymmetrical shape of the recesses 27 and to the asymmetrical configuration of the support feet 40, here again only one installation position of the control shaft 33 and of the valve disk 25 is possible. As a result of this, a positive anti-twist lock 54 is in general created between the control shaft 33 and the valve disk 25.

The spring element 32 is configured as a helical spring 41 in the present exemplary embodiment. The helical spring 41 is axially held between the laterally protruding support feet 40 of the intermediate element 31 and several radially protruding support protrusions 42 of the control shaft 33. The support protrusions 42 are uniformly distributed over the circumference of the control shaft 33 and configured in one piece therewith. Preferentially, two opposite support protrusions 42 merge into the lateral protrusions 35 and 26 [TN: 36?]. The support protrusions 42 together form a first axial stop 43 for the helical spring 41, while the support feet 40 form a second axial stop for the helical spring 41. During preassembly, the helical spring 41 is pushed onto the control shaft 33 up to the first axial stop 43; subsequently, the intermediate element 31 is pushed onto the control shaft 33 as described above and finally the valve disk 25, so that the feet 40 engage in the recesses 27.

Figure 8:
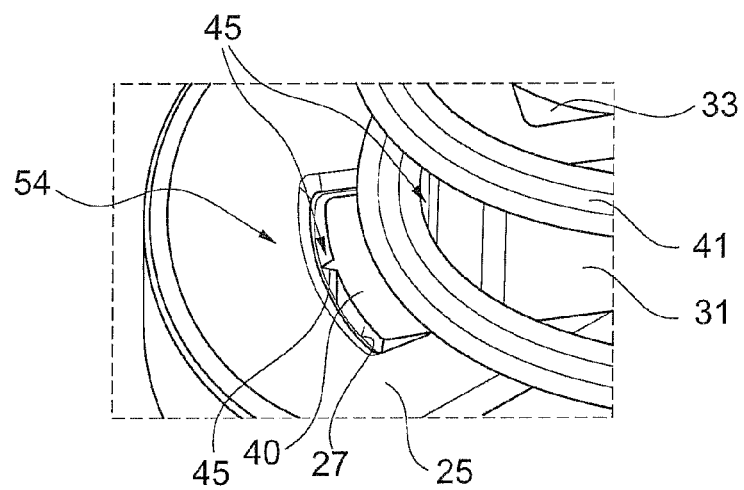
FIG. 8 is a locking mechanism of the preassembled unit according to an example embodiment.

In order to lock the preassembled unit 30, the intermediate element 31 has several elastically deformable clamping ribs 45, which extend parallel to the length of the disk valve 2 or to the axis of rotation of the control shaft 33 as a ridge, as is shown in FIG. 8. In this connection, the dimensions of the clamping ribs 45 are selected such that there is a frictional contact between the intermediate element 31 and the helical spring 41, as well as between the intermediate element 31 and the valve disk 25 owing to the pre-tension force provided by the elasticity, which ensures that the preassembled unit 30 is held together.

It is furthermore preferably provided that the control shaft 33 has a radial protrusion 46 on the side of the support protrusions 42 facing away from the spring element 41, as is shown in FIG. 6. With regard to the protrusions 35 and 36, the radial protrusion 46 is arranged on the control shaft 33 in a specific, predefined relative position and, in particular, configured in one piece therewith, so that when the disk valve 2 or the preassembled unit 30 is installed, there is a precise position of the valve disk 25 relative to the radial protrusion 46. This is ensured by the connections that provide only one installation option.

Figure 9:
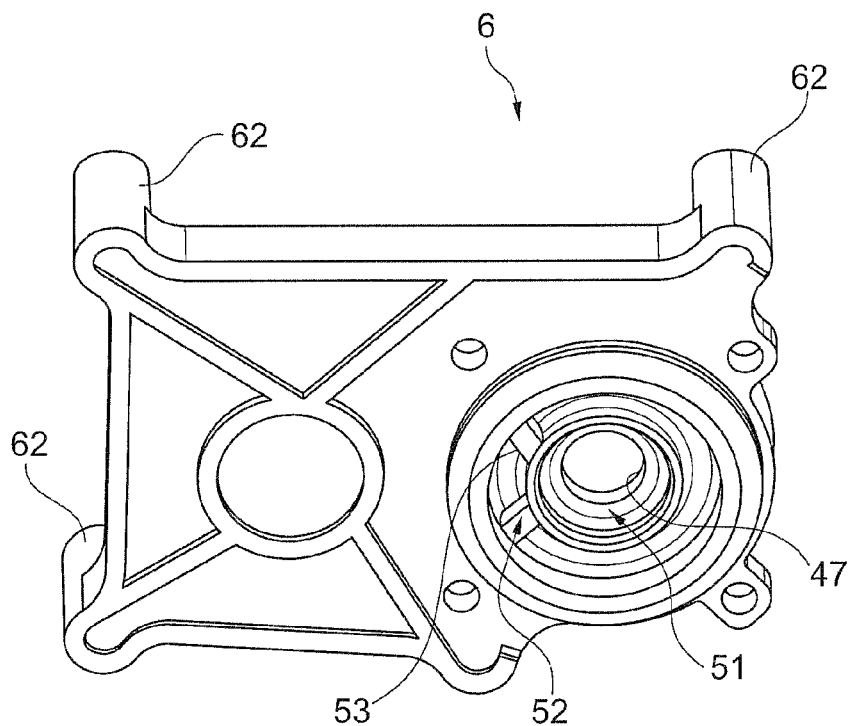
FIG. 9 is a perspective bottom view of a cover of the disk valve according to an example embodiment.

FIG. 9 is a perspective bottom view of the cover 6 or as viewed from the distributor housing 5. The cover 6 has a bearing opening 47 through which the end of the control shaft 33 opposite the free end 34 can be guided. This end is configured as a coupling end 48, and for this purpose has an external gearing 49 on its outer circumference that can be coupled with or be in operative connection with the actuating drive 3. As is shown in FIG. 2, on the side opposite the first axial stop 43, the support protrusions 42 form a second axial stop 50, with which the control shaft 33 is supported against the inner side of the cover 6. A sealing ring 51 is advantageously provided for sealing purposes. The bearing opening 47 as well as the coupling end 48 of the control shaft 33 are configured such that the control shaft 33 is mounted radially in the bearing opening 47 and axially on the cover 6.

As is apparent from FIG. 9, the cover 6 preferably also has two pivot stops 52 and 53 on its bottom, which are each formed by an axial protrusion on the bottom of the cover, and which, when the disk valve 2 is fully installed, are in the motion path of the radial protrusion 46. If the control shaft 33 is actuated by means of the actuating drive 3, it can only be turned between the two pivot stops 42 and 43 until the radial protrusion 46 comes in contact with one of the pivot stops 52 or 53. The pivot stops 52 and 52 can obviously also be formed by one correspondingly broad or molded protrusion of the cover 6.

The cover 6 as well as the distributor housing 5 are configured such that they can only be connected to one another in a defined relative position to one another, so that the cover 6 is clearly oriented in one direction on the distributor housing 5. As a result of this, the pivot stops 53 and 52 are in the known positions relative to the chambers 55, 56 or relative to the flow-through openings 19 and 20. Owing to the torque-proof connection of the valve disk 25 to the control shaft 33, as well as to the fixed position of the gasket 18 relative to the housing, and to the known arrangement of the radial protrusion as well as of the pivot stops 52, 53, it is thus possible to place the disk valve 2 in a precise initial position by means of the actuating drive without having to check this by means of an actually set volume flow through the disk valve 2.

During the installation, the preassembled unit 30 is first put together according to FIG. 6. Subsequently, the preassembled unit is introduced into the distributor housing 5, in which the profile gasket 15 as well as the gasket 18 have already been arranged and oriented according to the axial protrusion 17, so that the free end 34 of the control shaft 33 engages in the bearing seat 21, as is shown in FIG. 2. Subsequently, the cover 6 with the bearing opening 47 is pushed onto the coupling end 48 of the control shaft 33, and the control shaft 33 tensioned against the helical spring 41 owing to the first axial stop 43, so that the valve disk 25 is pressed in a spring-loaded state against the gasket 18, so that the valve disk 25 and the gasket 18 are tightly adjacent to one another and an undesired flow through the disk valve 2 is prevented. The cover 6 can be screwed together with the distributor housing 5, for example, as is shown in FIG. 1, in order to ensure a permanent connection of the housing 4. As the pivot stops 52, 53 and the radial protrusion 46 are arranged inside the housing 4, they are securely protected against outside influences and, in this respect are less prone to contamination. Depending on the turning position of the valve disk 25, the valve disk 25 and the gasket 18 separate or connect the chambers 55 and 56 from or to the chamber 57 allocated to the inlet connection 7, which chamber 57 is delimited by the distributor housing 5, the cover 6, valve disk 25, and the gasket 18.

As already explained in relation to FIG. 1, the drive unit 3 is mounted on the cover 6 of the disk valve 2. The drive unit 3 has a housing 58, in which the electric motor 59 and the gear 60 are arranged, forming a drive mechanism. The housing 58 has a plug connection 61 by means of which the drive unit 3 can be contacted electrically.

As is further evident from FIG. 1, the cover 6 of the housing 4 has at least three screw domes 62, which in the present exemplary embodiment protrude vertically from the cover 6 as cylindrical protrusions parallel to one another. Preferably a fourth screw dome 62 is also provided in the area which is not visible here. The housing 58 has screw domes 63 that are complementary to the screw domes 62, which screw domes 63—unlike the screw domes 62—have a much shorter axial length.

The housing 58 is supported on the screw domes 62 with the connection domes 63, so that the axes of the respective screw domes 62, 63 are flush with one another. The screw domes 62 each have an internal thread into which a screw 64, which is inserted through the opening of the opposite screw dome 63, can be screwed in order to secure the housing 58 to the cover 6 or to the housing 4, as is shown by way of example in FIG. 1 for one screw. Instead of the screw domes 63, differently molded counterparts can also be provided for the screw domes 62 on the housing 58 such as, for example, receiving recesses or laterally protruding lugs. In the simplest case, the housing 58 can be directly screwed onto the screw domes 62 with a housing part. Likewise, the screw domes 62 can also be arranged on the housing 58 and the screw domes 63 on the housing 4 or cover 6.

According to FIG. 1, the size of the screw domes 62 and 63 is selected such that the housings 58 and 4 are essentially spaced apart from one another so that there is a thermally insulating air gap between them. The air gap 66 prevents the drive unit 3 from being heated by the possibly heated medium conveyed through the disk valve 2, which may cause an impairment of its functionality.

Figure 10:
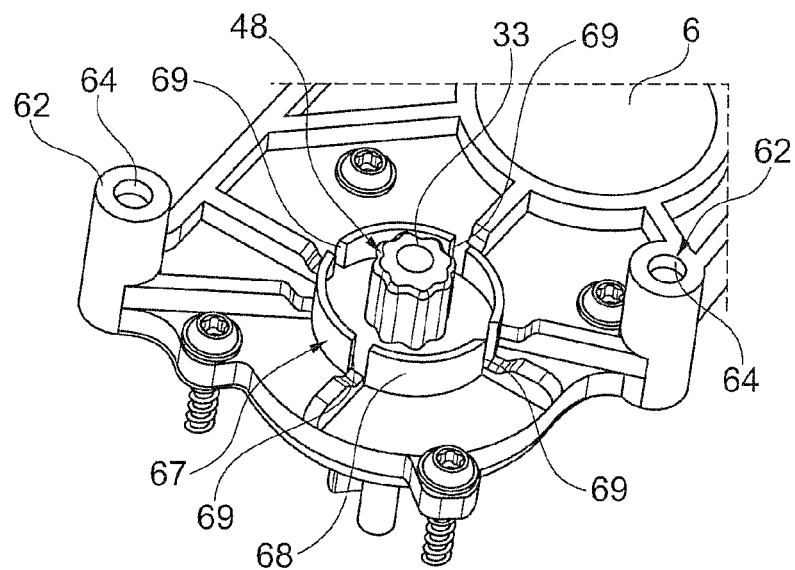
FIG. 10 is a perspective top view of the cover of the disk valve according to an example embodiment.

As can be seen from FIG. 10, which is a perspective view of the cover 6 of the housing 4, the cover 6 has a splash guard 67 allocated to the coupling end 48 of the control shaft 33. The splash guard 67 has a first protective panel 68 arranged coaxially to the control shaft 33 and circumferentially surrounding the coupling end 48, which protective panel 68 is configured in one piece with the cover 6. The first protective panel 68 has four narrow recesses 69 that are uniformly distributed over its circumference. The diameter of the protective panel 69 is selected in this case such that it is spaced apart relative to the coupling end 48 of the control shaft 33. In the present exemplary embodiment, the height of the protective panel 68 is selected such that it protrudes axially over the coupling end 48.

FIG. 10 is a sectional view of the valve arrangement 1 according to the section of FIG. 2, wherein the housing 58 of the drive unit 3 is now also shown, while the disk valve 2 is only partially shown. As already mentioned above, it is now evident that the drive unit has a drive shaft 70 which is the output shaft of the gear 60. The connection to the gear 60 as well as the gear 60 as such is not shown here, for the sake of clarity. The drive shaft 70 has an axial recess on its free front side facing the disk valve 2 or on its coupling end, which has a polygonal shape on its inner sleeve surface that forms the internal gearing 71. The internal gearing 71 is complementary to the external gearing 49 of the control shaft 33, so that the internal gearing and the external gearing 49 positively engage with one another and form a positive gear coupling 76, so that a torque can be transferred preferably with zero play from the drive shaft 70 to the control shaft 33. To compensate for manufacturing tolerances or potential temperature-induced changes in length, the coupling end 48 of the control shaft 33 is mounted axially with play in the drive shaft 70. Both the external gearing 49 and the internal gearing 71 form a coupling device 72, by means of which the drive shaft 70 and the control shaft 33 are operatively connected to one another for torque transfer.

The housing 58 of the drive unit 3 has second protective panels 73 and 74 allocated to the coupling device 72, which are likewise arranged coaxially to the axis of rotation of the drive shaft 70 and of the control shaft 33. In this connection, the second protective panel 74 has a diameter which is smaller than the diameter of the first protective panel 68, whereas the second protective panel 73 has a diameter which is larger than that of the protective panel 68. As a result of this, a circular receiving recess is formed between the protective panels 73 and 74 into which the first protective panel 68 protrudes when the housing 58 is mounted on the housing 4, as is shown in FIG. 10. In this case, the diameters are selected such that the first and second protective panels 68, 73, 74 together form a labyrinth seal 75 which is allocated to the coupling device 72. The second protective panels 73, 74 are conveniently also provided with narrow recesses which are preferably offset to the recesses 69. The recesses 69 as well as an axial distance between the free front sides of the front panels 68, 73, 74 to the respectively opposite housing ensure the ventilation and cooling of the coupling device 72. The labyrinth seal 75 also ensures that no splashing water or other dirt particles get into the region of the coupling device 72, thus also preventing moisture from getting into the drive unit 3 or passing by the control shaft 33 into the disk valve 2 in the region of the drive shaft 70. This ensures that the medium conveyed through the disk valve 2 is not contaminated and that moisture cannot reach the electrical/electronic components of the drive unit 3.

Figure 11:
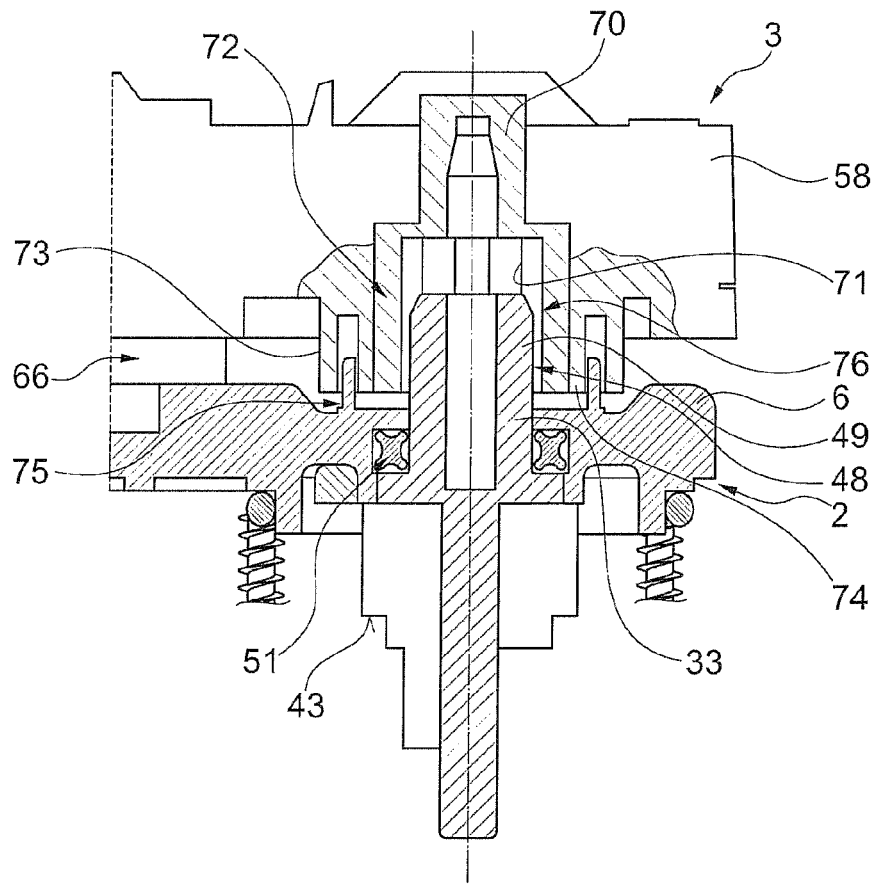
FIG. 11 is a longitudinal sectional view of a part of the disk valve arrangement according to an example embodiment.

The coupling device 72 located in the region of the air gap 66 furthermore makes it possible for the disk valve 2 and the drive unit 3 each to be completely preassembled in a simple manner before they are put together according to FIG. 1 or 11. By means of the external gearing 48 and the internal gearing 71 or of the respective polygonal shape, a plug connection between the control shaft 33 and the drive shaft 70 is possible in a simple manner, so that in order to couple the shafts to one another the drive unit 3 must merely be plugged onto the disk valve 2. This results in simple and quick installation of the disk valve arrangement 1. As the coupling device 72 is arranged between the housings 58 and 4, it is furthermore possible to implement a modular system in a simple manner, in which different disk valves 2 can be combined with different drive units 3. In this connection, the disk valves 2 must not necessarily be those according to the present exemplary embodiment; other valve units such as, for example, spherical valves or the like can obviously also be combined with the drive unit 3.

In summary, a valve arrangement 1 is provided having a valve, in particular, a disk valve 2 which has a first housing 4 with several connections 7-9 for a fluid or gaseous medium, and with a drive unit 3, which has a second housing 58 with a drive mechanism 59, 60 arranged therein. The housings 4, 58 are at least essentially spaced apart from one another so that there is a thermally insulating air gap 66 between them. Valve 2 has a control shaft 33 and drive unit 3 has a drive shaft 70 that is operatively connected to the drive mechanism 59, 60 and operatively connected or operatively connectable to the control shaft 33 by means of a coupling device 72. The coupling device 72 is arranged between the first and the second housing 4, 58, and a splash guard 67 is allocated to the coupling device 72, which splash guard 67 at least has one first protective panel 68 at least essentially circumferentially surrounding the coupling device 72. The splash guard 67 has at least one second protective panel 73, 74 circumferentially surrounding at least essentially the coupling device 72, which second protective panel 73, 74 has a larger or smaller diameter than the first protective panel 68 in order to form a labyrinth seal 75 for the coupling device 72 together with the first protective panel 68. The at least one first protective panel 68 is configured in one piece with the first housing 4, and the at least one second protective panel 73, 74 is configured in one piece with the second housing 58. An axial distance is provided between the free front sides of the protective panels 68, 73, 73 to the respective opposite housings, and the first and/or second housing 4, 58 has at least one spacer, which is, in particular, configured as a screw dome 62, 63.

According to an example embodiment, the coupling device 72 is configured as a positive coupling 76.

According to another example embodiment, the coupling device 72 is configured as a gear coupling 76 or as a claw coupling 76.

According to a further example embodiment, the coupling device 72 is formed by an external gearing 49 of the control shaft 33 and by an internal gearing 71 of the drive shaft 70 engaging in the external gearing 49.

According to another example embodiment, the first protective panel 68 has one or more recesses 69.

According to yet another example embodiment, the second protective panel 73, 74 has one or more recesses.

According to a further example embodiment, the recesses 69 of the first protective panel 68 and of the second protective panel 73, 74 are offset with respect to one another.

What is claimed is:

1. A valve arrangement comprising:
 a valve comprising a first housing with a plurality of connections for a fluid or gaseous medium and a control shaft, and
 a drive unit comprising:
  a second housing with a drive mechanism,
  a drive shaft that is operatively connected to the drive mechanism and operatively connected or operatively connectable to the control shaft by means of a coupling device, the coupling device being arranged between the first housing and the second housing, and
  a splash guard allocated to the coupling device, wherein the splash guard has at least one first protective panel circumferentially surrounding the coupling device and at least one second protective panel circumferentially surrounding the coupling device, wherein the at least one second protective panel has a larger or smaller diameter than the at least one first protective panel in order to form a labyrinth seal for the coupling device together with the first protective panel, wherein the at least one first protective panel is configured in one piece with the first housing, and the at least one second protective panel is configured in one piece with the second housing, and wherein an axial distance is provided between free front sides of the at least one first protective panel and the at least one second protective panel and respective opposite housings,
 wherein the first housing and the second housing are spaced apart from one another to form a thermally insulating air gap between them, and wherein the first housing and/or the second housing comprises at least one spacer which is configured as a screw dome.

2. The valve arrangement according to claim 1, wherein the coupling device is configured as a positive coupling device.

3. The valve arrangement according to claim 1, wherein the coupling device is configured as a gear coupling device or as a claw coupling device.

4. The valve arrangement according to claim 1, wherein the coupling device is formed by an external gearing of the control shaft and by an internal gearing of the drive shaft engaging in the external gearing.

5. The valve arrangement according to claim 1, wherein the first protective panel comprises one or more recesses.

6. The valve arrangement according to claim 1, wherein the second protective panel comprises one or more recesses.

7. The valve arrangement according to claim 5, wherein the one or more recesses of the first protective panel and the one or more recesses of the second protective panel are offset with respect to one another.

8. The valve arrangement according to claim 1, wherein the valve comprises a disc valve.

\* \* \* \* \*